US009726266B2

(12) United States Patent
Pettey

(10) Patent No.: US 9,726,266 B2
(45) Date of Patent: Aug. 8, 2017

(54) HOBBY SERVO MOTOR LINEAR ACTUATOR SYSTEMS

(71) Applicant: Robotzone, LLC, Winfield, KS (US)

(72) Inventor: Brian T. Pettey, Winfield, KS (US)

(73) Assignee: Robotzone, LL, Winfield, KS (US)

( * ) Notice: Subject to any disclaimer, the term of this patent is extended or adjusted under 35 U.S.C. 154(b) by 0 days.

(21) Appl. No.: 15/063,826

(22) Filed: Mar. 8, 2016

(65) Prior Publication Data

US 2016/0186843 A1    Jun. 30, 2016

Related U.S. Application Data

(63) Continuation of application No. 14/301,557, filed on Jun. 11, 2014, now Pat. No. 9,312,739, which is a continuation of application No. 13/655,883, filed on Oct. 19, 2012, now Pat. No. 8,791,663.

(51) Int. Cl.
| | |
|---|---|
| *F16H 25/20* | (2006.01) |
| *H02K 7/06* | (2006.01) |
| *H02P 7/00* | (2016.01) |
| *H02K 11/21* | (2016.01) |
| *H02K 11/215* | (2016.01) |
| *H02K 11/22* | (2016.01) |

(52) U.S. Cl.
CPC ............... *F16H 25/20* (2013.01); *H02K 7/06* (2013.01); *H02K 11/21* (2016.01); *H02K 11/215* (2016.01); *H02K 11/22* (2016.01); *H02P 7/00* (2013.01); *F16H 2025/204* (2013.01); *F16H 2025/2031* (2013.01)

(58) Field of Classification Search
CPC ...................................................... G05B 19/19
USPC .......................................... 318/652, 638, 560
See application file for complete search history.

(56) References Cited

U.S. PATENT DOCUMENTS

| | | | |
|---|---|---|---|
| 5,053,685 A | 10/1991 | Bacchi | |
| 5,121,019 A | 6/1992 | Pradler | |
| 5,557,154 A | 9/1996 | Erhart | |
| 5,806,402 A | 9/1998 | Henry | |
| 5,809,833 A * | 9/1998 | Newport | F16H 25/20 192/141 |
| 7,285,884 B2 | 10/2007 | Pettey | |
| 7,336,009 B2 | 2/2008 | Pettey | |

(Continued)

OTHER PUBLICATIONS

"Photo Higher Design History" received from a Third Party during licensing negotiations in Oct. 2012, 4 pages.

(Continued)

*Primary Examiner* — David S Luo
(74) *Attorney, Agent, or Firm* — Kelly, Holt & Christenson, PLLC; Katherine M. Scholz

(57) ABSTRACT

A lead screw attachment mechanism for a linear actuator system is provided. The attachment mechanism comprises an attachment housing comprising a fixed cover configured to house the attachment mechanism. The attachment mechanism comprises a first coupling mechanism configured to couple the attachment mechanism to an output shaft of a motor and a second coupling mechanism configured to couple the attachment mechanism to a lead nut, wherein the lead nut is configured to move linearly along an axis defined by a length of the attachment mechanism. The attachment mechanism is configured to rotate about the axis, within the fixed cover.

19 Claims, 8 Drawing Sheets

(56) References Cited

U.S. PATENT DOCUMENTS

| | | | |
|---|---|---|---|
| 7,501,731 | B2 | 3/2009 | Pettey |
| 7,559,129 | B2 | 7/2009 | Pettey |
| 7,671,497 | B2 | 3/2010 | Pettey |
| 7,750,517 | B2 | 7/2010 | Pettey |
| 7,795,768 | B2 | 9/2010 | Pettey |
| 7,819,036 | B2 | 10/2010 | Haneball et al. |
| 7,859,151 | B2 | 12/2010 | Pettey |
| 7,891,902 | B2 | 2/2011 | Pettey |
| 7,934,691 | B2 | 5/2011 | Pettey |
| 8,277,349 | B2 | 10/2012 | Erhart et al. |
| 8,378,610 | B2 * | 2/2013 | Jensen ............... F16H 25/2015 318/468 |
| 8,816,553 | B2 | 8/2014 | Pettey |
| 2009/0179129 | A1 | 7/2009 | Pettey |
| 2009/0247045 | A1 | 10/2009 | Pettey |
| 2011/0115344 | A1 | 5/2011 | Pettey |
| 2012/0139468 | A1 | 6/2012 | Pettey |
| 2012/0200510 | A1 | 8/2012 | Pettey et al. |
| 2012/0313557 | A1 | 12/2012 | Pettey et al. |
| 2013/0099614 | A1 | 4/2013 | Pettey |
| 2013/0099631 | A1 | 4/2013 | Pettey |

OTHER PUBLICATIONS

"Kaper: Digital Photography E-Resources". What's New, Reverse chronology of additions or changes to Kaper, http://www.kaper.us/NewKAP_R.html, printed Nov. 20, 2012, 14 pages.

"Improving Servo Positioning Accuracy", David P. Anderson, Printed from ,http://www.geology.smu/dpa-www/robo/servo/servohac.htm>, printed on Mar. 7. 2016, 8 pages.

"RunRyder: Helicopters", Aerial Photography and Video: My Rig—cam mount, http://rc.runryder.com/helicopter/t47322p1/, printed Nov. 26, 2012, 7 pages.

"Kaper: Digital Photography E-Resources", Basics/Camera Cradle/360 Servo Conversions, Method 2—Geared External Pot, http://kaper.us/basics/BAS-360_2_R.html, printed Nov. 20, 2012. 2 pages.

"RunRyder: Helicopters", Aerial Photography and Video: My First Camera Mount, http://rc.runryder.com/helicopter/t55545p1/, printed Nov. 20. 2012, 1 page.

"RunRyder Helicopters", Aerial Photography and Video: Front mount side frame contest, http://rc.runryder.com/helicopter/t144518p1/, printed Nov. 26, 2012, 6 pages.

"RunRyder, Helicopters", Aerial Photography and Video: My current camera mount, http://rc.runryder.com/helicopter/t135298p1/, printed Nov. 26, 2012, 5 pages.

"RunRyder: Helicopters", Aerial Photography and Video: My new camera mount development, http://rc.runryder.com/helicopter/t137031p1/, printed Nov. 26, 2012, 7 pages.

"RunRyder: Helicopters", Aerial Photography and Video: Injection moulded Camera Mount, http://rc.runryder.com/helicopter/t178271p1/, printed Nov. 20, 2012, 4 pages.

Prosecution history of U.S. Appl. No. 14/301,557 including; Application and drawings filed on Jun. 11 2014, Non-Final Rejection mailed on Sep. 11, 2015, Amendment filed on Nov. 12, 2015, and Notice of Allowance mailed on Dec. 11, 2015. 45 pages.

Prosecution history of U.S. Appl. No. 13/655,883 including; Application and drawings filed on Oct. 19, 2012, Non-Final Rejection mailed on Apr. 3, 2014, Amendment filed on Apr. 21, 2014, Notice of Allowance mailed on May 28, 2014, and Issue Notification mailed on Jul. 9, 2014. 43 pages.

\* cited by examiner

HOBBY SERVO MOTOR LINEAR ACTUATOR SYSTEMS

CROSS-REFERENCE TO RELATED APPLICATION

The present application is a continuation of and claims priority to U.S. patent application Ser. No. 14/301,557, filed Jun. 11, 2014, which is a continuation of Ser. No. 13/655,883, filed Oct. 19, 2012, the contents of which are hereby incorporated by reference in its entirety.

BACKGROUND

A servo motor (a.k.a. simply a "servo") is a device having a rotatable output shaft. The output shaft can typically be positioned to specific angular positions in accordance with a coded signal received by the servo. It is common that a particular angular position will be maintained as long as a corresponding coded signal exists on an input line. If the coded signal changes, the angular position of the shaft will change accordingly. Control circuits and a potentiometer are typically included within the servo motor casing and are functionally connected to the output shaft. Through the potentiometer (e.g. a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servos that include output shafts having varying rotational and torque capabilities. For example, the rotational and/or torque capability of an industrial servo is typically less restricted than that of a hobby servo. That being said, hobby servos are generally available commercially at a cost that is much less than that associated with industrial servos.

Because hobby servos are relatively small and inexpensive, they are popular within the hobby-mechanical industry for applications such as, but by no means limited to, hobby robotic applications and radio-controlled models (cars, planes, boats, etc.). One example of a hobby servo is the Futaba S-148 available from Futaba Corporation of America located in Schaumburg, Ill.

SUMMARY

A lead screw attachment mechanism for a linear actuator system is provided. The attachment mechanism comprises an attachment housing comprising a fixed cover configured to house the attachment mechanism. The attachment mechanism comprises a first coupling mechanism configured to couple the attachment mechanism to an output shaft of a motor and a second coupling mechanism configured to couple the attachment mechanism to a lead nut, wherein the lead nut is configured to move linearly along an axis defined by a length of the attachment mechanism. The attachment mechanism is configured to rotate about the axis, within the fixed cover.

BRIEF DESCRIPTION OF THE DRAWINGS

FIGS. 5-1, 5-2, and 5-3 are perspective views of a hobby servo motor.

DETAILED DESCRIPTION

Figure 1:
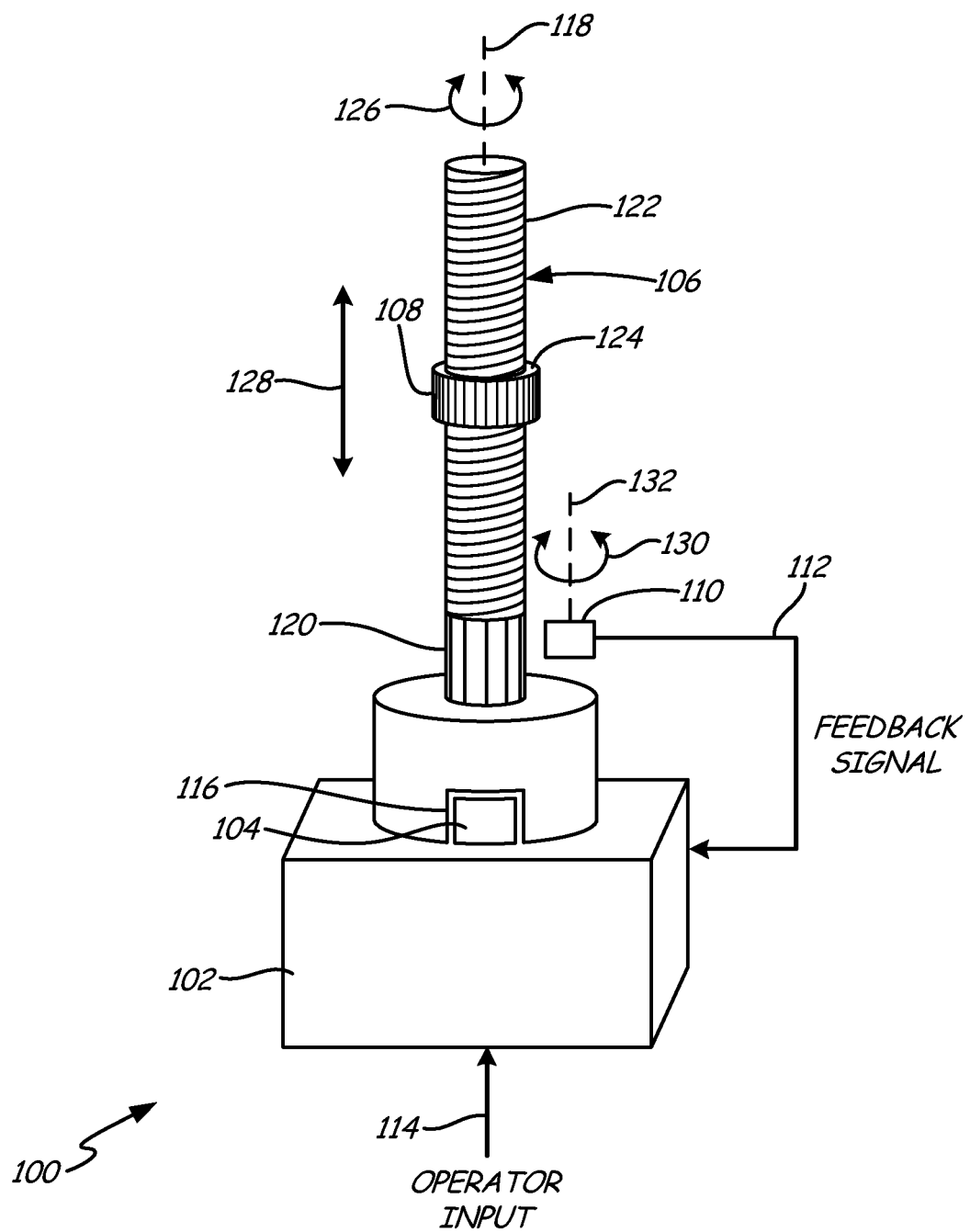
FIG. 1 is a schematic drawing of a linear actuator system with a lead nut.

FIG. 1 is a schematic drawing of one example of a linear actuator system 100. System 100 optionally includes a motor 102, a lead screw attachment mechanism 106, a lead nut 108, and a feedback mechanism 110. Motor 102 illustratively has a rotatable output shaft 104, and motor 102 may be part of either an open-loop system or a closed-loop system. In an open-loop system, the position, direction of rotation, and/or speed of rotation of output shaft 104 are based on an operator input 114 without any feedback. In a closed-loop system, the position, direction of rotation, and/or speed of rotation of output shaft 104 are based on both an operator input 114 and feedback 112 from feedback mechanism 110.

The output shaft 104 illustratively has a number of splined features, and the attachment mechanism 106 has an inner surface 116 that is configured to functionally engage the splined features such that rotation of output shaft 104 is transferred to attachment mechanism 106. Accordingly, output shaft 104 and attachment mechanism 106 are in-line with each other and rotate about a same axis of rotation 118.

In an embodiment, the outer surface of attachment mechanism 106 has multiple different textured surfaces. For example, the outer surface of attachment mechanism 106 may have two or more threaded surface. In the particular example shown in FIG. 1, attachment mechanism 106 has a lower threaded section 120 and an upper threaded section 122. The lower section 120 may have gear-teeth type threading, and upper section 122 may have screw type threading. In other embodiments, only one of sections 120 or 122 may have threading, and the other section has a smooth outer surface. Embodiments are not however limited to any configuration.

Lead nut 108 illustratively has an inner surface 124 that has threading that corresponds to the threading of upper section 122. For instance, inner surface 124 may have screw type threading that enables lead nut 108 to be able to move up and down along lead screw attachment mechanism 106 in a screw and nut type fashion. In one embodiment, lead nut 108 is prevented from rotating while lead screw attachment 106 is rotated. This results in lead nut 108 moving up and down along the attachment mechanism 106 in the directions shown by arrow 128. Accordingly, system 100 is able to turn rotational movement 126 of lead screw attachment mechanism 106 into linear motion 128 of the lead nut 108.

In some, but not all embodiments, feedback mechanism 110 is rotatably connected to surface 120 of attachment mechanism 106 such that rotation of mechanism 106 is directly translated to rotation 130 of mechanism 110 about axis of rotation 132. Axis 132 is optionally parallel to axis of rotation 118 of mechanism 106. The rotation may be translated through gear teeth on the outer surface of feedback mechanism 110 that correspond to gear teeth on the surface 120. In one example of such an embodiment, feedback mechanism 110 comprises a potentiometer. In other embodiments, feedback mechanism 110 comprises an encoder such as, but not limited to, a magnetic encoder, an optical encoder, a rotary encoder, or a linear encoder.

Figure 2:
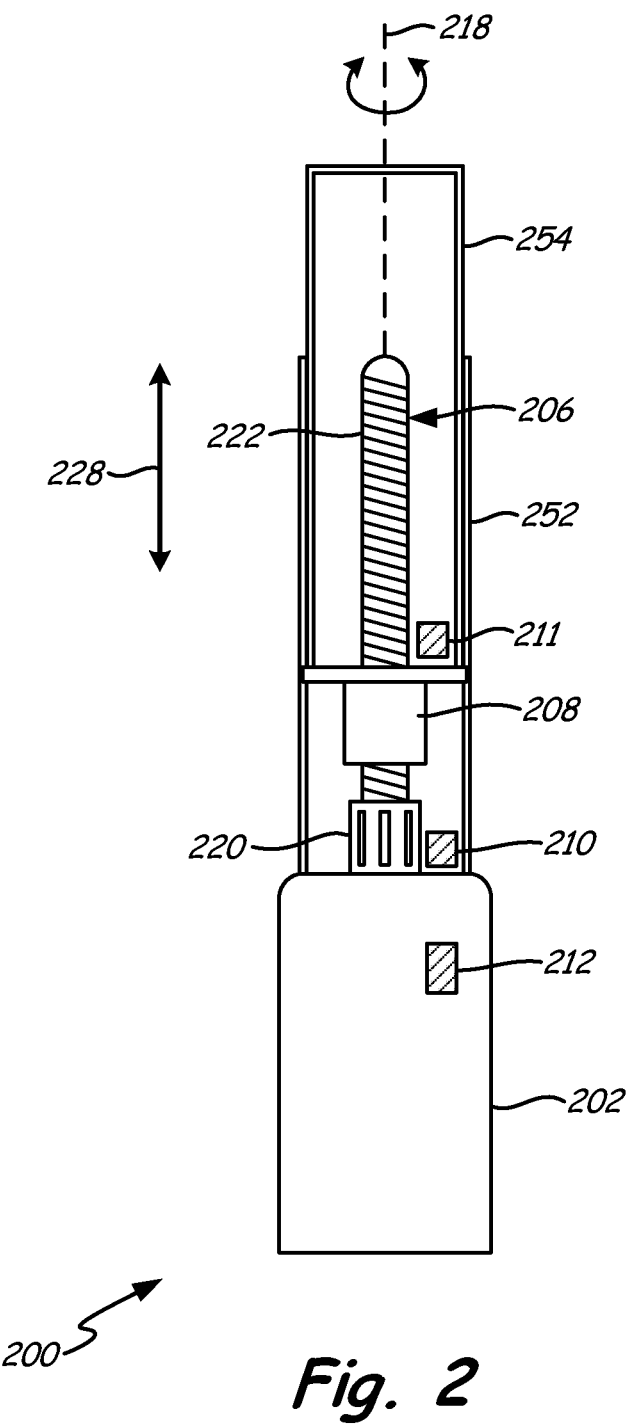
FIG. 2 is a schematic drawing of a linear actuator system with a sliding tube and a fixed cover.

FIG. 2 is a schematic drawing of another example of a linear actuator system 200. System 200 optionally includes a motor 202 (e.g. a hobby servo motor), a lead screw attachment mechanism 206, a lead nut 208, a fixed cover 252, and a sliding tube 254. The lead screw attachment mechanism 206 optionally includes a threaded lower section 220 and a threaded upper section 222.

In an embodiment, lead screw attachment mechanism 206 is rotated about an axis of rotation 218 by an output shaft of motor 202. The lead nut 208 is prevented from rotating by the fixed cover 252 and the sliding tube 254. Fixed cover 252 is illustratively stationary (i.e. does not move relative to motor 202). Sliding tube 254 is able to move in the linear directions 228, but is not able to rotate about axis 218. Accordingly, as mechanism 206 is rotated, lead nut 208 and the attached sliding tube 254 are able to move up and down in the linear directions shown by arrows 228.

System 200 may be either a closed-loop system or an open-loop system. In the case of a closed-loop system, system 200 may include a feedback mechanism in a number of different places. In one embodiment, feedback mechanism 210 is configured such that it does not move linearly with lead nut 208. For instance, feedback mechanism 210 may include a potentiometer or encoder that is rotated by the lower threaded section 220. In another embodiment, feedback mechanism 211 is configured such that it does move linearly with lead nut 208. For instance, feedback mechanism 211 may include an optical or magnetic sensor that determines its position relative to fixed cover 252. Furthermore, in yet another embodiment, a feedback mechanism 212 may be included within motor 202 (e.g. within a casing of motor 202) such that it is not exposed to other components, and perhaps provides a cleaner appearance. Embodiments are not limited to any particular configuration and can include any number of feedback mechanisms including none in the case of an open-loop system.

Figure 3:
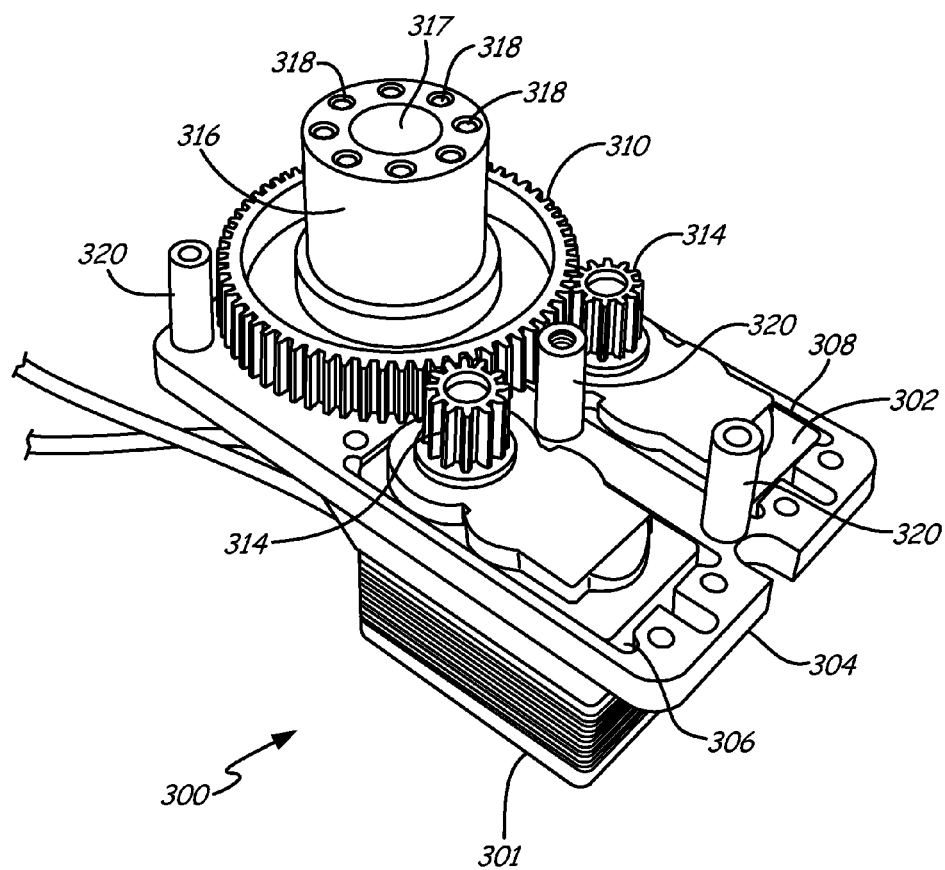
FIG. 3 is a perspective view of a multiple motor drive mechanism with an outer casing removed to show the multiple motors.

FIG. 3 shows a perspective view of a multi-motor drive mechanism 300. In certain embodiments of the present disclosure, a multi-motor drive mechanism 300 is used to rotate a lead screw attachment mechanism (e.g. mechanism 106 in FIG. 1 or mechanism 206 in FIG. 2). In other words, the motor 102 in FIG. 1 and motor 202 in FIG. 2 do not necessarily need to be single motor systems. Instead, the motors in those figures can be replaced with a multi-motor drive mechanism. Additionally, multi-motor drive mechanisms can be used by themselves without being incorporated in a linear actuator system.

Multi-motor drive mechanism 300 in FIG. 3 illustratively includes two motors (e.g. two hobby servo motors) 301 and 302. Embodiments are not however limited to any specific number of motors and can include more than the illustrated two (e.g. 3, 4, 5, 6, etc.). The two motors are secured within a mounting bracket 304. Bracket 304 optionally includes two apertures 306 and 308 that are configured to receive motors 301/302 and secure them to the bracket 304.

Bracket 304 is also configured to support a rotatably mounted gear 310. Gear 310 is functionally engaged with two gears 312 and 314. Gears 312 and 314 are illustratively configured to fit around a splined output shaft of motors 301 and 302. However, in another embodiment, system 300 does not include gears 312 and 314, and instead the output shafts of motors 301 and 302 are used directly to rotate gear 310.

In one embodiment, gears 312 and 314 have smaller outer circumferences (i.e. smaller diameters) than gear 310. In such a configuration, gear 310 is able to provide a greater amount of torque than could motors 301 and 302 by themselves. Embodiments are again not limited to any particular configuration, and gears 310, 312, and 314 could have different relative sizes.

Gear 310 is illustratively attached to an attachment hub 316 that directly translates rotation from gear 310. Hub 316 includes a center aperture 317 that is surrounded by a number of satellite apertures 318. Center aperture 317 may be the same size, larger, or smaller than satellite apertures 318. This may be beneficial in that it provides many different options for attaching other components to hub 316. For instance, a same or similar center and satellite aperture pattern can be repeated on other components such that all of the components can be connected together. Furthermore, bracket 304 may include one or more attachment posts 320 that can be used to secure the components shown in FIG. 3 within an outer casing.

Figure 4:
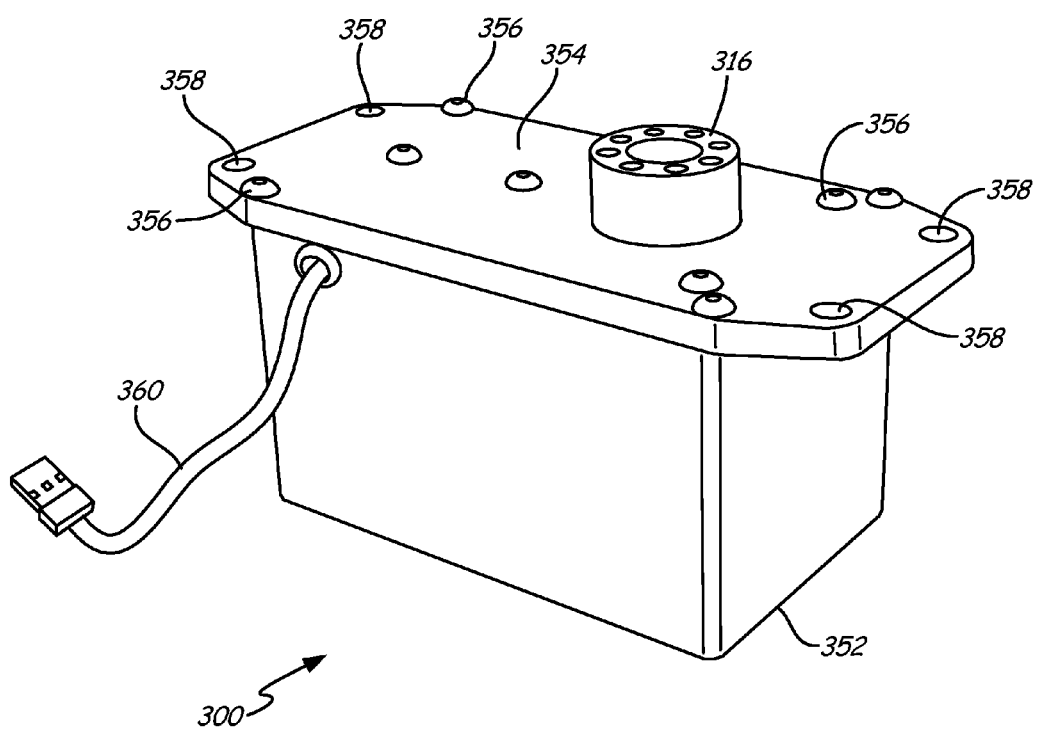
FIG. 4 is a perspective view of a multiple motor drive mechanism with an outer casing.

FIG. 4 shows a perspective view of a multi-motor drive mechanism within a casing 300. The casing includes a bottom portion 352 and a top portion 354. Portions 352 and 354 illustratively support and protect the components shown in FIG. 3 (e.g. the motors 301/302, gears 310/312/314, etc.). In an embodiment, top casing portion 354 includes a number of apertures and securing mechanisms (e.g. screws) that are used to secure the mounting bracket 304 and/or posts 320 shown in FIG. 3 to the outer casing. The top casing portion 354 may also include a number of apertures 358 that can be used to secure the multi-motor drive mechanism 300 within an operating environment. FIG. 4 further shows that system 300 may include one group of wires 360 that are used to provide control signals, power, etc. to the components within system 300 (e.g. motors 301 and 302).

Figures 1, 5:
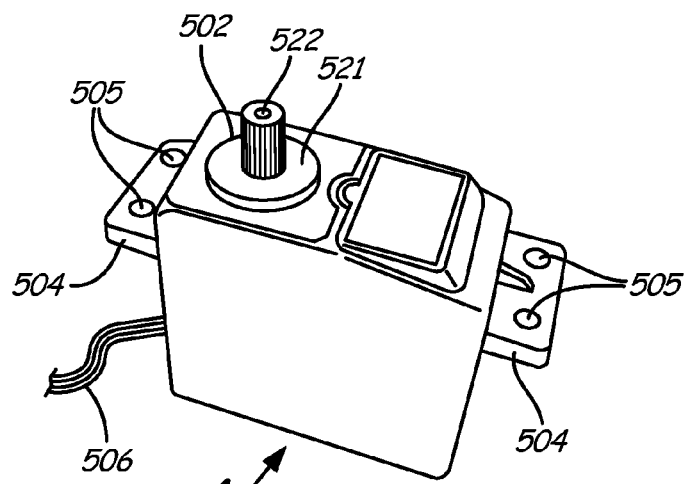
Figures 2, 5:
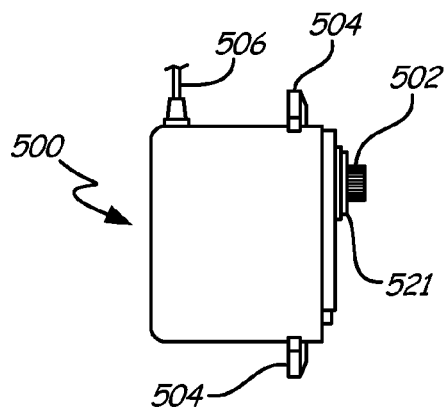
Figures 3, 5:
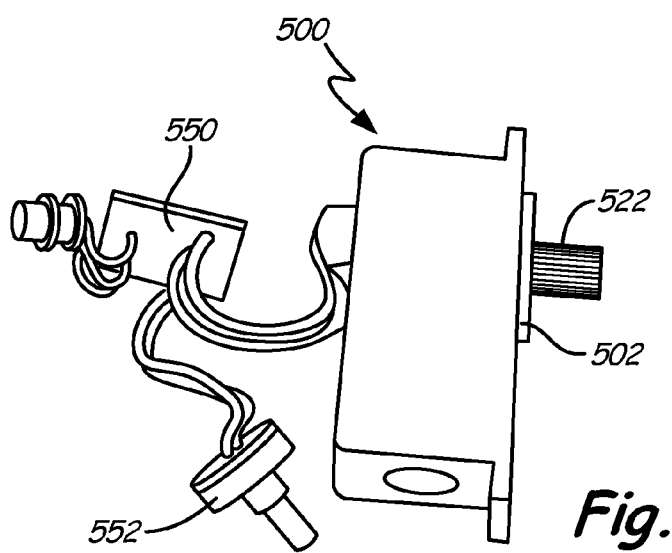

FIG. 5-1 is a perspective view of a hobby servo motor 500, and FIG. 5-2 is a side view of hobby servo motor 500. In an embodiment, servo motor 500 includes a feedback mechanism (e.g. feedback 110 in FIG. 1) and is a motor such as motor 102 in FIG. 1. Servo 500 includes attachment flanges 504. Flanges 504 optionally include apertures 505 formed therein for receiving an attachment mechanism (e.g., a screw, bolt, etc). The attachment mechanism is illustratively utilized to secure servo 500 within an operative environment. Servo 500 also includes an electrical connection 506 that enables the servo to receive electrical power and/or control signals.

Servo 500 includes a rotatable output shaft 502 also known as a servo spline or a servo splined output shaft. Shaft 502 optionally has an outer perimeter or periphery that has splines or teeth. It is common for shaft 502 to have a 23, 24 or 25 tooth configuration.

Output shaft 502 is positioned to specific angular positions in accordance with a coded input signal received by the servo. It is common that a particular angular position will be maintained as long as a corresponding coded signal exists on an input line. If the coded signal changes, the angular position of the servo output shaft 502 will change accordingly.

In an embodiment, output shaft 502 includes a threaded orifice 522. Threaded orifice 522 extends into splined output shaft 502 from its distal end. Orifice 522 is illustratively used to secure an item such as a gear, horn, or other attachment mechanism to shaft 502. Servo 500 further includes a planar or relatively planar surface 521 that surrounds shaft 502. In accordance with one aspect of the present disclosure, gears, horn, and attachment mechanisms that are attached to, rotatably coupled to, or functionally engaged to shaft 502 also include a planar or relatively planar surface. In such an embodiment, a surface of the item being attached and surface 521 are engaged to one another in a relatively flush relationship.

FIG. 5-3 is a perspective view of hobby servo motor 500 showing an internal potentiometer 552 and control circuit 550 removed from the hobby servo housing or casing. Control circuit or circuits such as circuit 550 and an internal potentiometer such as potentiometer 552 are commonly included within the housing or casing of a hobby servo motor. The control circuitry and potentiometer are functionally connected to the hobby servo motor rotatable output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct. In an embodiment, internal potentiometer 552 is replaced with a feedback mechanism (e.g. mechanism 110 in FIG. 1). In at least certain circumstances, the new feedback mechanism includes an internal encoder that enables output shaft 522 to perform multiple rotations (e.g. 720 degrees, 1080 degrees, etc.). Additionally, it should be mentioned that in certain embodiments, motor 500 comes preconfigured with an internal encoder and does not need to be modified.

Rotation of a servo output shaft such as shaft 502 is typically limited to around 180 degrees. In most cases, rotation is limited at least because of an internal mechanical stop. It is also common that servo output shaft 502 is capable of producing a relatively limited amount of torque power. The torque and rotational limitations of a hobby servo are adequate for many applications; however, some applications require a servo having torque power and/or a rotational capacity that is beyond the capability of a typical hobby servo. Increased torque power and/or rotational capacity enable greater mechanical flexibility.

In accordance with one embodiment of the present disclosure, hobby servo motors such as servo 500 are internally modified to enable a range of output shaft rotation that is greater than its "off-the-shelf" capability. For example, in accordance with one embodiment, an internal mechanical stopping mechanism, which prevents rotation past a predetermined angle, is removed from hobby servo motor to enable for continuous rotation in either direction. As a result of the modification, the rotatable output shaft of a hacked or modified servo is able to rotate beyond the range of rotation prior to the modification.

Following modification of servo 500, limitations inherent to the internal potentiometer make it a poor choice for subsequent control functionality. As previously mentioned, in a normal servo operating configuration, the servo motor rotates the servo output shaft corresponding to the coded signal received by the servo. The output shaft is rotated until the signal from the internal potentiometer of the servo, which corresponds to the angular position of the servo output shaft, matches the coded signal received by the servo. Most hobby servos contain internal potentiometers such as potentiometer 552 shown in FIG. 5-3 that are physically limited to monitoring a limited range of angles (e.g., often less than 200 degrees). Therefore, when a servo 500 is modified for extended rotation, the internal potentiometer is not the best control component for applications that require the servo shaft to rotate beyond the typical rotation limits in order to provide improved rotational capacity. The internal potentiometer is not likely to support control of a range of rotation that is even equivalent to the original rotational range of the servo output shaft.

In accordance with one aspect of the present disclosure, the internal potentiometer is disconnected and an external/auxiliary potentiometer is inserted into the control scheme to facilitate proportional control of the servo splined output shaft. Alternatively or in addition, the internal potentiometer is optionally replaced with a feedback mechanism (e.g. mechanism 110 in FIG. 1). In an embodiment, servo 500 utilizes the coded input signal and the signal from an external potentiometer to rotate and position the output shaft. A particular external potentiometer having any of a variety of control characteristics can be selected and implemented based on the requirements of a given application. Therefore, a potentiometer with a rotational range of substantially less than or greater than 180 degrees can be selected and implemented as desired.

Figure 6:
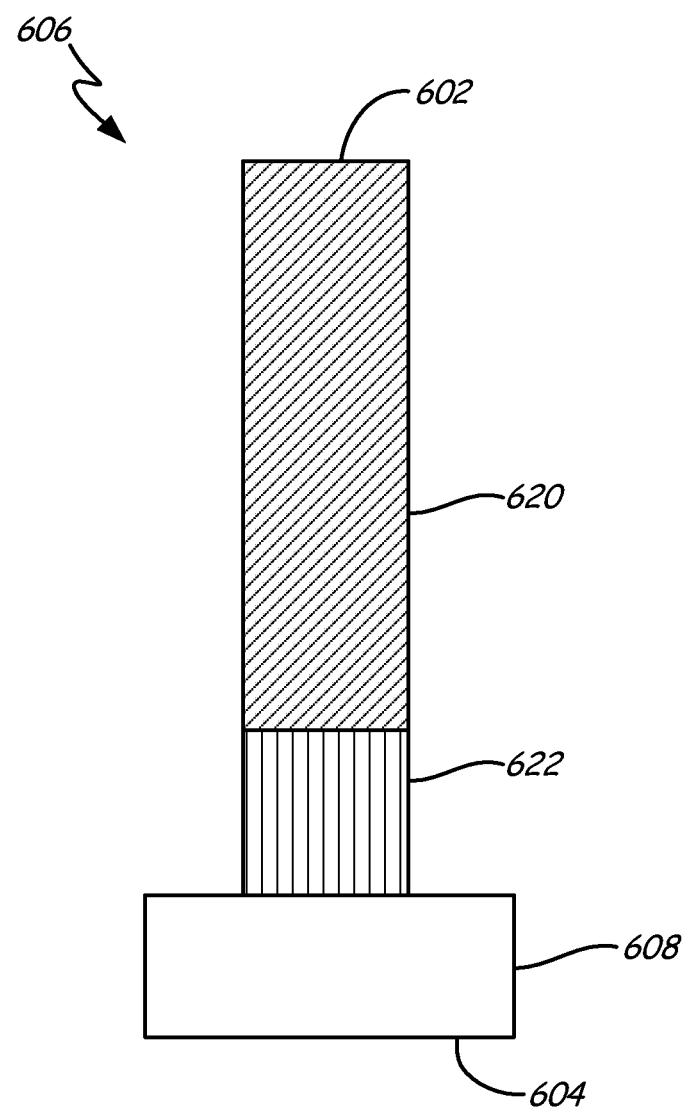
FIG. 6 is a side view of a lead screw attachment mechanism that includes an outer surface having multiple different types of threading.

FIG. 6 is a side view of a lead screw attachment mechanism 606. Attachment mechanism 606 illustratively includes a top surface 602, a bottom surface 604, and an output shaft attachment housing 1308. Additionally, mechanism 606 optionally includes two or more different surfaces along the rotatable shaft. In the embodiment shown in FIG. 6, mechanism 606 includes a first threaded surface 620 and a second threaded surface 622. First threaded surface 620 may for instance include screw, worm screw, gear, or any other type of threading. Second surface 622 may also illustratively include screw, gear, or any other type of threading. In one embodiment, first and second threaded surfaces 620 and 622 include different types of threading (e.g. one includes screw threading and the other gear threading), or alternatively, both surfaces 620 and 622 may include the same type of threading. In another embodiment, one or more of surfaces 620 or 622 may instead include a non-textured surface (e.g. a smooth outer surface such as that shown in FIG. 8). Additionally, embodiments of mechanism 606 are not limited to only including two surfaces along the rotatable shaft. Embodiments of mechanism 606 optionally include any number of surfaces along the rotatable shaft. For instance, mechanism 606 may include three different surfaces instead of the two shown in FIG. 6 with one surface having screw threading, one gear threading, and the other surface being smooth.

Figure 7:
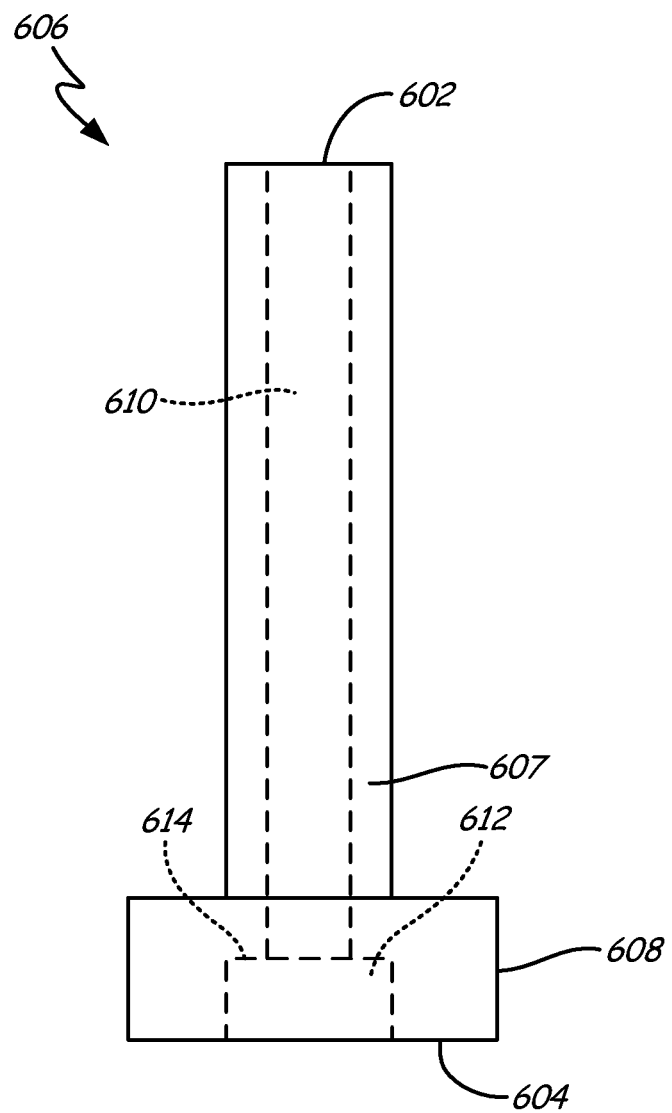
FIG. 7 is a side view that shows internal components of the lead screw attachment mechanism shown in FIG. 6.

FIG. 7 is a side view of lead screw attachment mechanism 606 that highlights internal features with dotted lines. Mechanism 606 includes top surface 602, attachment mechanism orifice 610, attachment surface 607, output shaft attachment housing 608, top receiving surface 614, spline receiving surface 612, and bottom surface 604. Embodiments of mechanism 606 include any desired dimensions. Embodiments of mechanism 606 are made from every material. Examples of materials include rigid materials such as 6061 T6 aluminum.

Figure 8:
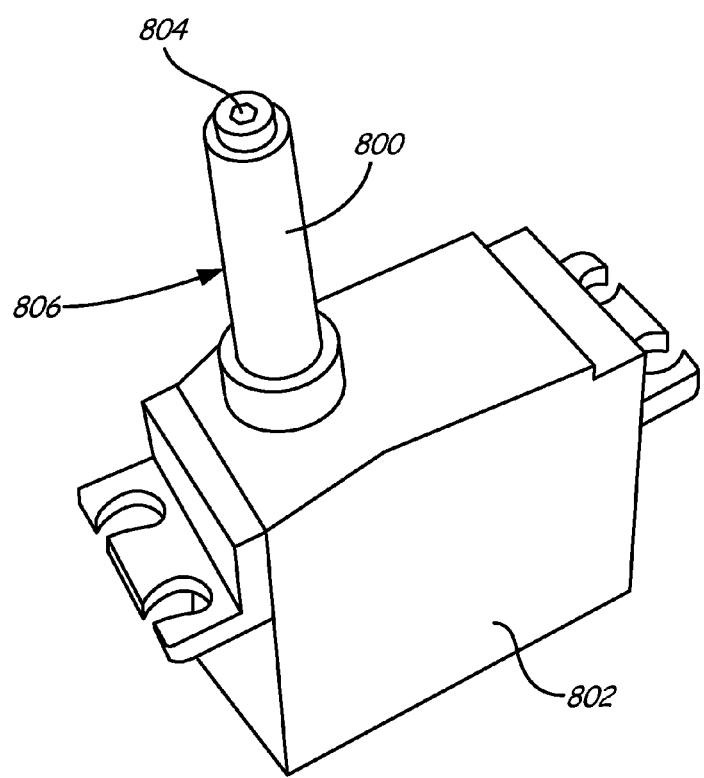
FIG. 8 is a perspective view of a lead screw attachment mechanism attached to a hobby servo motor.

FIG. 8 is a perspective view of an embodiment of a lead screw attachment mechanism 806 attached to an exemplary hobby servo 802. The particular embodiment of mechanism 806 includes a smooth outer surface 800. In other embodiments, outer surface 800 includes one or more textured portions as is shown in the previous drawings. Mechanism 806 is securely and functionally engaged to a motor rotatable output shaft, and mechanism 806 bottom surfaces 604 and/or 652 (shown and labeled in FIG. 7) are flushly engaged with a circular planar surface of the motor. In an embodiment, mechanism 806 is securely attached to hobby servo 802 using screw 804. In other embodiments, attachment mechanisms other than screws are used. The attachment of mechanism 806 to hobby servo 802 provides many useful features. Mechanism 806 provides enhanced performance such as increased strength and durability. Mechanism 806 supports greater side-loads on the servo than the servo could support alone. Mechanism 806 also allows for items that cannot be directly attached to a hobby servo to be indirectly attached.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hobby servo motors, it will be appreciated by those skilled in the art that the teachings of the disclosure can be applied to other types of components, without departing from the scope and spirit of the disclosure. Also, it should be noted that embodiments of the present disclosure illustratively include any one or more features described in this specification or shown in the figures.

What is claimed is:

1. A lead screw attachment mechanism for a linear actuator system, the attachment mechanism comprising:
    an attachment housing comprising a fixed cover configured to house the attachment mechanism;
    a first coupling mechanism configured to couple the attachment mechanism to an output shaft of a motor and a second coupling mechanism configured to couple the attachment mechanism to a lead nut, wherein the lead nut is configured to move linearly along an axis defined by a length of the attachment mechanism; and
    wherein the attachment mechanism is configured to rotate about the axis, within the fixed cover.

2. The attachment mechanism of claim 1, wherein the motor is configured to drive rotation of the output shaft.

3. The attachment mechanism of claim 1, and further comprising:
    a sliding cover circumferentially enclosed, and configured to move within, the fixed cover.

4. The attachment mechanism of claim 3, wherein movement of the sliding cover comprises linear movement along the axis of the attachment mechanism.

5. The attachment mechanism of claim 4, wherein the sliding cover is physically restrained from rotational movement about a rotational axis.

6. The attachment mechanism of claim wherein the sliding cover is configured to prevent rotational movement of the lead nut.

7. The attachment mechanism of claim 1, wherein the second coupling mechanism comprises threads configured to receive and engage with corresponding lead nut threads.

8. The attachment mechanism of claim 1, wherein the attachment mechanism is part of a closed-loop system.

9. The attachment mechanism of claim 8, and further comprising a feedback mechanism decoupled from the lead nut such that the feedback mechanism remains stationary as the lead nut moves along the axis.

10. The attachment mechanism of claim 8, and further comprising a feedback mechanism coupled to the lead nut such that the feedback mechanism moves linearly along the axis with the lead nut.

11. A housing for a linear actuator system, the housing comprising:
    a fixed cover configured to house and support an attachment mechanism, wherein the attachment mechanism is configured to couple a lead nut to an output shaft of a motor;
    a moveable cover at least partially housed within the fixed cover;
    a lead nut, coupled to an attachment mechanism housed within the moveable cover; and
    wherein movement of the lead out along the attachment mechanism actuates movement of the moveable cover.

12. The housing of claim 11, wherein the motor is configured to drive rotation of the output shaft, which is configured to cause rotation of the attachment mechanism about an axis, wherein the axis is defined as the length of the attachment mechanism.

13. The housing of claim 12, wherein movement of the lead nut is limited to linear movement along the axis.

14. The housing of claim 13, wherein the moveable cover is configured to move linearly along the axis.

15. The housing of claim 14, wherein movement of the lead nut along the axis drives movement of the moveable cover.

16. The housing of claim 11, wherein the moveable cover is circumferentially enclosed within the fixed cover.

17. An linear actuator system comprising:
    a motor configured to rotationally drive an output shaft;
    an attachment mechanism configured to couple to, and rotate with the output shaft;
    a lead nut coupled to the attachment mechanism, and configured to move linearly along the attachment mechanism as the attachment mechanism rotates; and
    wherein coupling the lead nut to the attachment mechanism comprises a plurality of lead nut threads receiving, and engaging with, a corresponding plurality of attachment mechanism threads.

18. The system of claim 17, and further comprising a moveable housing configured to enclose the attachment mechanism, wherein the moveable housing is configured to move linearly along the attachment mechanism.

19. The system of claim 17, and further comprising a fixed housing configured to retain a stationary position as the attachment mechanism rotates.

* * * * *